(12) United States Patent
Patrin

(10) Patent No.: US 11,603,152 B2
(45) Date of Patent: Mar. 14, 2023

(54) GIROCYCLE IX

(71) Applicant: Raymond A Patrin, Kingston, PA (US)

(72) Inventor: Raymond A Patrin, Kingston, PA (US)

(*) Notice: Subject to any disclaimer, the term of this patent is extended or adjusted under 35 U.S.C. 154(b) by 5 days.

(21) Appl. No.: 17/825,485

(22) Filed: May 26, 2022

(65) Prior Publication Data

US 2022/0379982 A1 Dec. 1, 2022

Related U.S. Application Data

(60) Provisional application No. 63/258,786, filed on May 28, 2021.

(51) Int. Cl.
*B62M 1/10* (2010.01)
*B62H 1/10* (2006.01)

(52) U.S. Cl.
CPC ............... *B62H 1/10* (2013.01); *B62M 1/10* (2013.01)

(58) Field of Classification Search
CPC .................................. B62H 1/10; B62M 1/10
USPC ........................................................ 74/5.22
See application file for complete search history.

(56) References Cited

U.S. PATENT DOCUMENTS

| | | | |
|---|---|---|---|
| 1,258,431 A * | 3/1918 | Myers .................... | B62M 1/10 280/217 |
| 4,272,094 A * | 6/1981 | Patrin .................... | B62M 1/10 280/217 |
| 4,712,806 A | 12/1987 | Patrin | |
| 9,796,444 B1 * | 10/2017 | Lin ......................... | B62K 1/00 |

OTHER PUBLICATIONS

The Girocycle, American Bicyclist and Motorcyclist, Nov. 1991, vol. 112, No. 11, p. 34.

* cited by examiner

*Primary Examiner* — Jacob B Meyer
*Assistant Examiner* — Felicia L. Brittman
(74) *Attorney, Agent, or Firm* — Sanford J. Piltch

(57) ABSTRACT

A hollow flywheel gyro assembly mounted within the wheel supports of a two wheeled vehicle having a split drive hub for providing continued rotational motion to the hollow flywheel gyro as the vehicle is stopped when the brake is engaged and functioning to create gyroscopic stability about the drive wheel while simultaneously creating a stability enhancing air envelope surrounding the drive wheel and hollow flywheel gyro by the intake of adjacent air through the air intake apertures and the exhaust of that air volume from within the hollow flywheel gyro through air exhaust apertures as the hollow flywheel gyro rotates independently of the drive wheel of the vehicle causing the vehicle to remain in an upright equilibrium with the vehicle stopped.

5 Claims, 4 Drawing Sheets

SECTION A-A

SECTION B - B

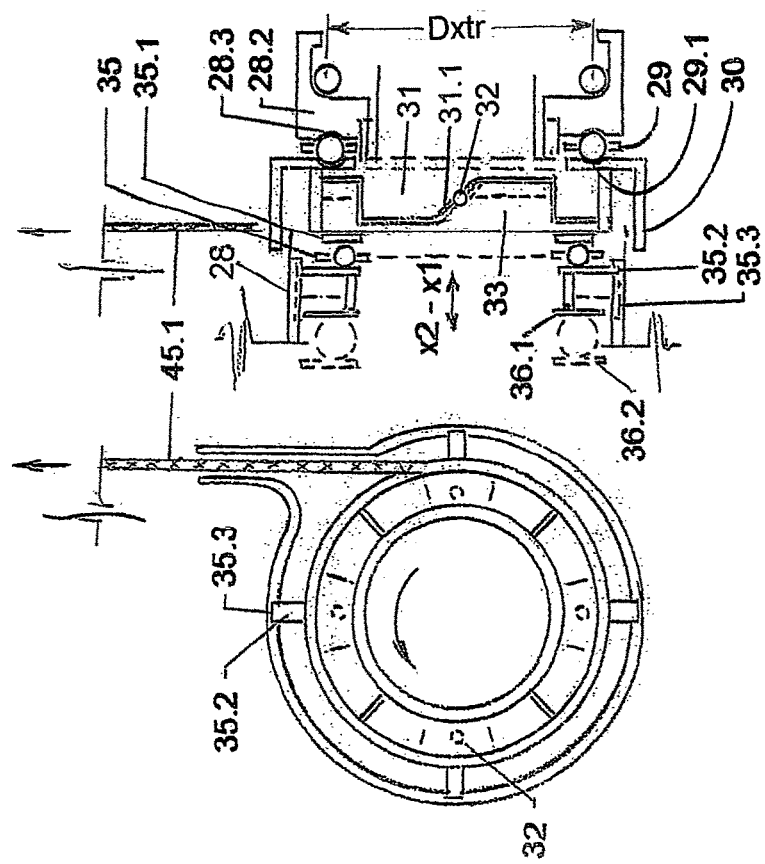
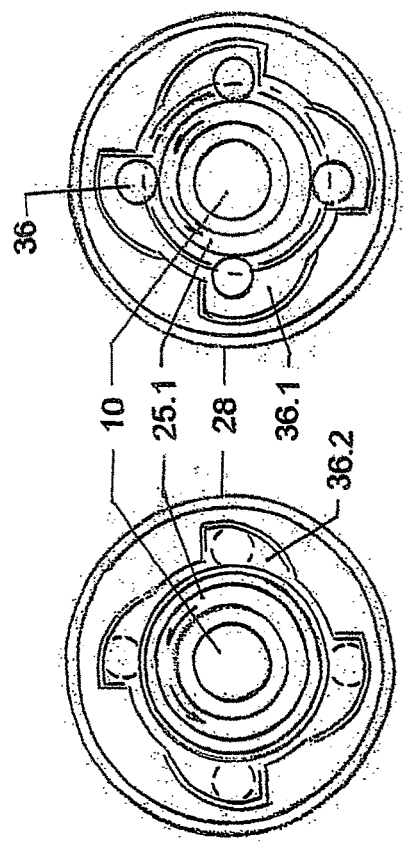
FIG. 6
FIG. 5
FIG. 3
SECTION C - C
FIG. 4
SECTION D - D

SECTION F-F

GIROCYCLE IX

BACKGROUND OF THE INVENTION

The invention pertains to a hollow-gyro assembly applicable in the fields of energy conservation, rocketry, space travel, transportation, spinning tops, and the like. In rocketry the hollow-gyro reduces the system payload weight to conserve take-off and travel energy. For simplicity in describing the functioning of the hollow-gyro, a two-wheeled vehicle illustrating its effectiveness compared to a solid-gyro comparing the intended results of stability while having the advantage of lighter weight.

Subsequent to my inventions described in U.S. Pat. No. 4,272,094 titled POWERCYCLE, granted on Jun. 9, 1981 and U.S. Pat. No. 4,712,806 titled GIROCYCLE, granted Dec. 15, 1987, this inventor has investigated further and experimented to derive the presently described improvement of a hollow flywheel gyro mechanism featuring the drive wheel of a bicycle, motorcycle, and similar vehicles to sustain the rider in an upright equilibrium position when the vehicle is stopped, through the application of low energy pedal or motor power to rotate the flywheel gyro located within the spokes of the wheel or specifically louvered rim supports, foregoing the necessity of stepping down and balancing the vehicle. The application of the hollow-gyro has a significant advantage over the previous invention in resulting energy conservation.

SUMMARY OF THE INVENTION

This patent application is related to the hollow flywheel gyro invention as applied to two-wheeled vehicles. As exhibited herein and conveyed to be understood in lucid terms, related to energy conservation in the transportation travel safety field areas. The present invention relates to an apparatus for stabilizing a vehicle by maintaining an upright position when approaching a stopped status and maintaining that stabilization when stopped. The apparatus is comprised of a hollow flywheel gyro mounted within the support spokes of the drive wheel of the vehicle and onto a split hub of the main axle of the drive wheel of that vehicle. The hollow flywheel gyro is geared to permit greater independent rotation of the hollow gyro than the drive wheel of the vehicle. The hollow gyro has a lighter mass, a high torsional power, and is free to continue rotational motion when decoupled from the vehicle drive wheel while maintaining its driven rotational motion providing gyroscopic rotational stability to maintain the upright position of the vehicle when stopped. The hollow gyro includes a plurality of specifically shaped and sized apertures located in predetermined spaced apart positions in the sides of the hollow gyro for drawing air into the hollow interior space of the hollow gyro and then expelling that air to create a stabilizing air envelope to assist in maintaining the upright position of the vehicle when stopped.

The hollow flywheel gyro exhibits a plurality of specifically shaped and sized apertures along its sides that are of two types. The first type of apertures are air intake apertures shaped as ovals and extending outward along radial lines from the drive wheel hub at predetermined angular positions for approximately half the distance from the drive wheel hub to the outer perimeter rim of the hollow gyro. The second type of apertures are air expelling apertures shaped as ovals positioned outward from the first type apertures and extending outward along the same radial lines from the drive wheel hub at the same predetermined angular positions. The first type apertures consist of larger ovals being positioned with each of their longer axes along the radial lines and the second type apertures consist of smaller ovals positioned with each of their longer axes perpendicular to and along the radial lines such that air drawn into the first type larger oval apertures located closer to the hollow gyro center is pressurized within the hollow gyro due to the smaller size of the second type oval apertures located closer to the perimeter rim of the hollow gyro. In this way the expelled pressurized air exits the hollow gyro through the air expelling apertures with a greater force assisting in maintaining an upright position for the vehicle when stopped.

The apparatus for stabilizing a vehicle further includes complimentary air exhausting apertures consisting of arcuate openings located along the sides of the perimeter rim of the hollow gyro. The complimentary air exhausting apertures are located at positions outward of and along the same radial lines as the air intake and air expelling apertures for acting as additional air expelling apertures. These complimentary air exhausting apertures direct the exhausted pressurized air in a direction to assist in the rotation of the hollow gyro in allowing the hollow gyro to attain higher speeds with lower input energy when stopped and in motion to provide additional stabilization of the vehicle.

The apparatus for stabilizing a vehicle further includes air channel blades within the hollow center of the hollow gyro positioned at angular spacings creating substantially similar compartments within the hollow gyro separating the air intake and air expelling apertures along the same outwardly extending radial lines from each other. The air channel blades guide the incoming airflow from the air intake apertures moving the captured air by centrifugal force to the air expelling apertures closer to the outer perimeter of the hollow gyro.

The apparatus for stabilizing a vehicle further includes a braking system having a binary function for operating the vehicle brakes and simultaneously operating a transmission for disconnecting the drive wheel from the vehicle pedals while maintaining connection of the hollow gyro to the vehicle pedals for continued driven rotational motion. As the brake handle is engaged, applying the brake pads against the vehicle wheels to stop the vehicle, the transmission connected to the drive wheel is placed into idle mode so that continuing rotational motion of the vehicle pedals is transferred entirely to the hollow gyro through the plurality of gears connecting the transmission to the hollow gyro.

The hollow flywheel gyro is mounted within the drive wheel structure of a two wheeled vehicle intended to transport humans safely, so that when stopped, as compared to conventional two wheeled vehicles' limitations of stability while stopped, the driver remains seated in an upright equilibrium, forgoing an involuntary step-off to remain upright. The major advantage of the present invention of a hollow flywheel gyro is its capability to deliver the desired stabilization by not only functioning with gyroscopic stability but also creating an air envelope surrounding the hollow flywheel gyro to enhance the gyroscopic stability. The described functions of the hollow flywheel gyro will result in creating vertical or upright equilibrium and ride stability with its lightweight concentric location and functionality, compared to gyros of prior patents, while providing effortless rider safety.

BRIEF DESCRIPTION OF THE DRAWINGS

For the purpose of illustrating the invention, there is shown in the drawings forms which are presently preferred;

it being understood, however, that the invention is not limited to the precise arrangements and instrumentalities shown.

FIG. 3 is a sectional view of the hollow flywheel gyro hub transmission assembly taken along Line C-C of FIG. 2.

FIG. 4 is a sectional view of the hollow flywheel gyro hub transmission assembly taken along Line D-D of FIG. 2.

FIG. 5 is a partial sectional view of the hollow flywheel gyro transmission hub of the present invention.

FIG. 6 is a partial sectional view of the interlink between the hollow flywheel gyro and the drive wheel of the vehicle.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
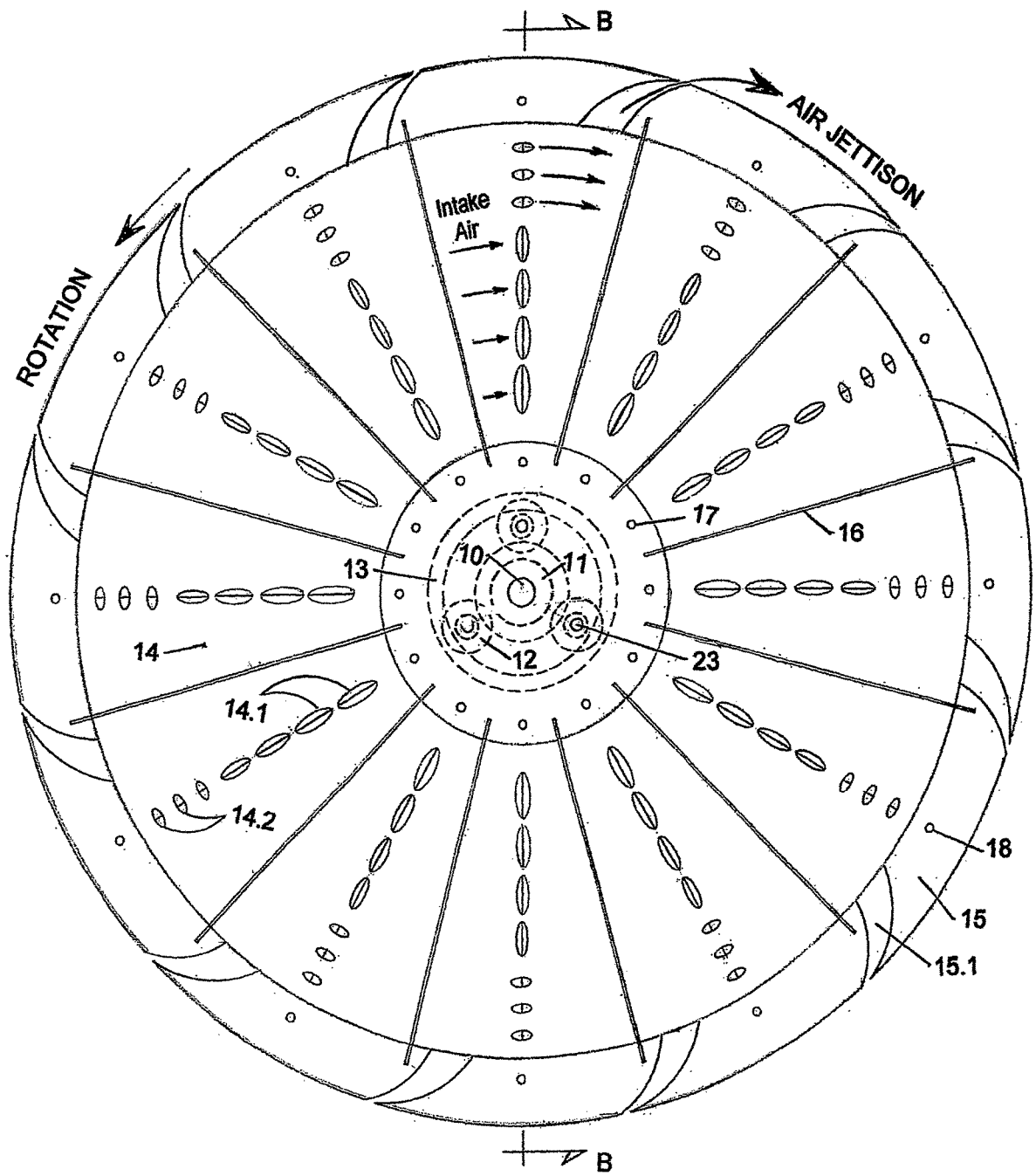
FIG. 1 is a partial side view and partial sectional view of the hollow flywheel gyro wheel of the present invention taken along Line A-A of FIG. 2.

Referring now to the drawings in detail, where like numerals refer to like parts or elements, there is shown in FIG. 1 a main axle 10 surrounded by a sun gear 11 mounted or keyed to the main axle. A series of planetary gears 12 engage the sun gear 11 to accelerate the rotational motion engaging an orbital gear 13 that supports the paired hollow sides 14 of the hollow flywheel gyro 1. Each of the hollow sides 14 of the hollow flywheel gyro 1 contains a series of air compressing louvers 14.1 spaced outwardly in a straight line from the central axis 10 of the hollow flywheel gyro 1 with each set of louvers 14.1 spaced in an angular array having an equal distance between each set. The air compressing louvers 14.1 may take on any appropriate shape or configuration such that each of them is contoured to draw air into the hollow interior of the hollow flywheel gyro 1. Also contained on each of the hollow sides 14 are a series of sets of air exhausting orifice louvers 14.2 spaced outwardly in a straight radial line from the central axis 10 of the hollow flywheel gyro 1 substantially along the same straight radial line arrangement as the corresponding sets of air compressing louvers 14.1. This arrangement results in each set of air exhausting orifice louvers 14.2 arranged outward of each set of corresponding air compressing louvers 14.1 such that the louvers 14.2 are spaced angularly apart in the same angular array and having an equal distance between each set of louvers 14.2 as their corresponding sets of louvers 14.1. The air exhausting louvers 14.2 may take on any appropriate shape or configuration such that each of them is contoured to permit air to escape from the hollow interior of the hollow flywheel gyro 1 in a desired direction, i.e., in the direction opposite to the rotation of the hollow flywheel gyro 1.

Figure 2:
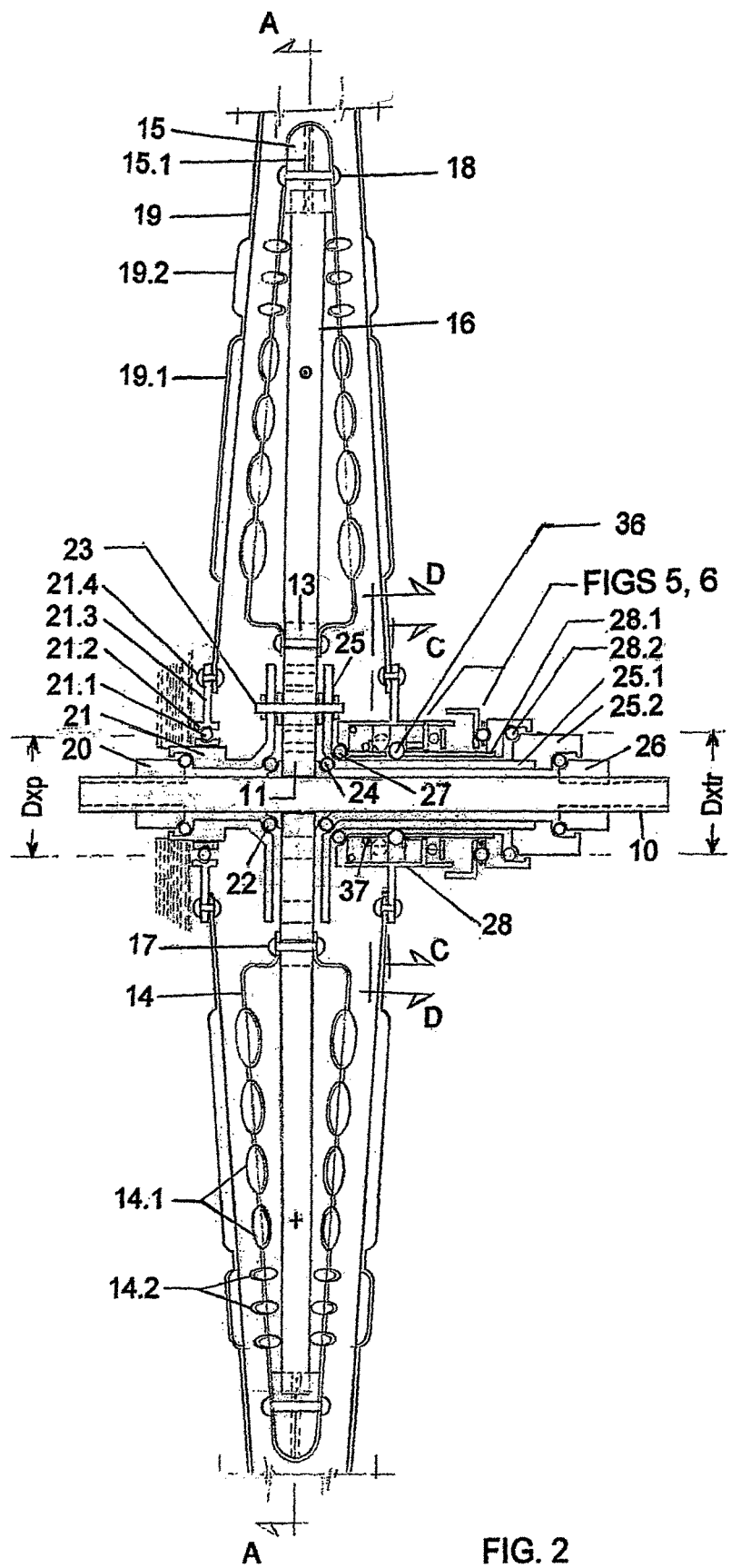
FIG. 2 is a cross-sectional view of the hollow flywheel gyro wheel of the present invention taken along Line B-B of FIG. 1.

In addition to FIG. 1 the reader may now also refer to FIG. 2. Each hollow half side 14 within the split half rings 15 that are keyed to each other and form its outer perimeter also individually forming complimentary air exhausting orifices 15.1 alternately covered by connecting the two side halves 14, sealed and shaped to jettison the intake compressed air outward from the outermost periphery of the hollow flywheel gyro assembly, thus increasing the gyroscopic impetus by centrifugal air-thrust. A series of air channel blades 16, providing support between the outer periphery of orbital gear 13 and the interior perimeter of each of the split half rings 15, are used to channel the intake air from the air compressing louvers 14.1 toward the air exhausting louvers 14.2 and air expelling louvers and orifices 15.1.

Each of the paired halves 15 of the hollow flywheel gyro assembly are positively attached together by a series of cooperating threaded insert supports 17 located around the outward projecting flanges of the base of the orbital gear 13. A second series of cooperating threaded insert supports 18 for positively attaching together the paired halves 15 are located around the outer periphery of the paired halves 15.

The radial spokes or blade type wheel supports 19 are utilized with additional air directing configurations as part of the present invention. Each of the radial spokes 19 having attached or formed with them air directing and compressing louvers 19.1 formed to draw air inward toward the hollow flywheel gyro as the wheel rotates feeding air into the air compressing louvers 14.1. The air directing and compressing louvers 19.1 may take on any appropriate shape or configuration. Also, as part of the radial spokes 19, are a series of air exhaust louvers 19.2 formed to jettison air in the opposite direction to air compressing louvers 19.1 to allow the air collected within the hollow between the paired halves 15 to be jettisoned outward from the air exhaust louvers 14.2 and air jettison orifices 15.1.

A cone 20 mounted on the chain drive or power side and threaded to the main axle 10 forms a bearing supporting the split hub 21 that is connected to the pedal chain sprocket which, in turn, supports the bearing 21.1 that allows the power wheel of the vehicle to be stopped while allowing the hollow flywheel gyro 1 to continue to rotate freely. The bearing 21.1 has a diameter of "Dxp" that is equal to the diameter "Dxtr" of bearing 28.2 on the transmission side of the hollow flywheel gyro 1. The connection of the chain drive to the main axle 10 includes an external run 21.2 of the bearing forming the hub connection 21.3 to the spokes 19 (or optional wheel supports) through a binding or threaded insert 21.4 so that the split hub 21 is independently supported and rotates on bearing 22 whose run is located between the main axle 10 and sun gear 11. The interior of split hub 21 also supports the planetary gear axles 23 with complementary lock-washers on both sides with spacers. Bearings 24 between the main axle 10 and sun gear 11 on the power transmission side support the split hub 25 forming a cylinder 25.1 key fit or threaded to the cone hub 25.2 powering the transmission by supporting the planetary gear axles 23 and rotating about the bearing cone 26 that is threaded to the main axle 10 and bearing 27 along the inner part of split hub 25.

The power transmission housing 28 is connected to and supports the spokes 19 (or optional blade type wheel supports) and forms a cylinder 28.1 key fit or threaded to hub bearing 28.2 having a diameter "Dxtr" located on the transmission side equals the diameter "Dxp" of bearing 21.1 on the power side, whose rear surface features bearing run 28.3 (FIG. 6) for bearing 29, rotating on bearing run 29.1 on the external surface of stationary section 30 of the transmission housing 28 which encompasses components featured as described herein Referring now to FIGS. 3-6 the various sections of the transmission of the hollow flywheel gyro 1 will be described. In FIG. 3, grip balls 36 clinched on cylinder 25.1 connecting the wheel in its normal position with the hollow flywheel gyro 1 which is the driving mode of the vehicle whereby both the hollow flywheel gyro and the drive wheel are both driven simultaneously when the vehicle pedals are turned. FIG. 4 shows grip balls 36 recede or move to a neutral position whereby the grip ball guards indicate the grip balls 36 are unaffected by the rotation of cylinder 25.1. The result of the receding of the grip balls 36 releases the vehicle wheel causing the hollow flywheel gyro 1 to be able to rotate independently.

FIGS. 5 and 6 depict the permanently stationary section 30 of the transmission in relation to the rotating transmission housing 28 connected to the wheel. See also, FIG. 2. With the vehicle brakes normally released, the counterpart disc 33 is at position x1, resting on the stationary transmission disc 31 (FIG. 6) and the grip balls 36 are engaged onto cylinder 25.1 to turn the wheel synchronously with the hollow flywheel gyro 1, powering the vehicle. As transmission cord 45.1 is pulled, counterpart disc 33 partially rotates and slides on slanted runs 31.1 moving to position x2 causing grip balls 36 to recede (FIG. 4) resulting in the release of cylinder 25.1 from clasping the grip balls 36 so that the wheel is disengaged from its power drive source and stops. The receding of the grip balls 36 also results in the freeing of the hollow flywheel gyro 1 to continue spinning such that the air intake and the directed air exhaust creates an air pocket or envelope surrounding the vehicle drive wheel. This created air pocket or envelope keeps the vehicle and rider with only light pedal driving force balanced in an upright equilibrium on the stopped vehicle, obviating stepping on the ground to prevent loss of balance.

The stationary transmission disc 31 has slanted runs 31.1 for roller or ball bearing sliders 32 (FIG. 6) causing the counterpart disc 33, when transmission cord 45.1 is pulled, to be displaced from position xi to position x2 equal to the diameter of the transmission grip balls 36. Flat bearing 35, separating the stationary bearing run 35.1 from expandable but stationary counterpart disc 33, when displaced from the rotatable bearing run 35.2, slides in internal guide channels 35.3 of the transmission housing 28. This movement by flat bearing 35 pressing on the transmission grip balls 36 between grip balls guards 36.1 on one side and guards 36.2 on the other results in the rotatable section of transmission housing 28 turning in unison with the wheel assembly supported by spokes 19 or other wheel supports.

Grip balls actuating plate curve 36.3 (FIG. 3), reconnects the hollow flywheel gyro 1 to the vehicle wheel with a slight jolt when brake lever 49 releases the vehicle brakes. Grip balls actuating plate curve 36.4 maintains the grip balls 36 disconnected from the stopped vehicle wheel while the vehicle brakes are engaged allowing the hollow flywheel gyro 1 to idle. Control spring 37 (FIG. 2) maintains the grip balls 36 clutched onto cylinder 25.1, its normal position, when the vehicle is in motion.

Figures 7, 8:
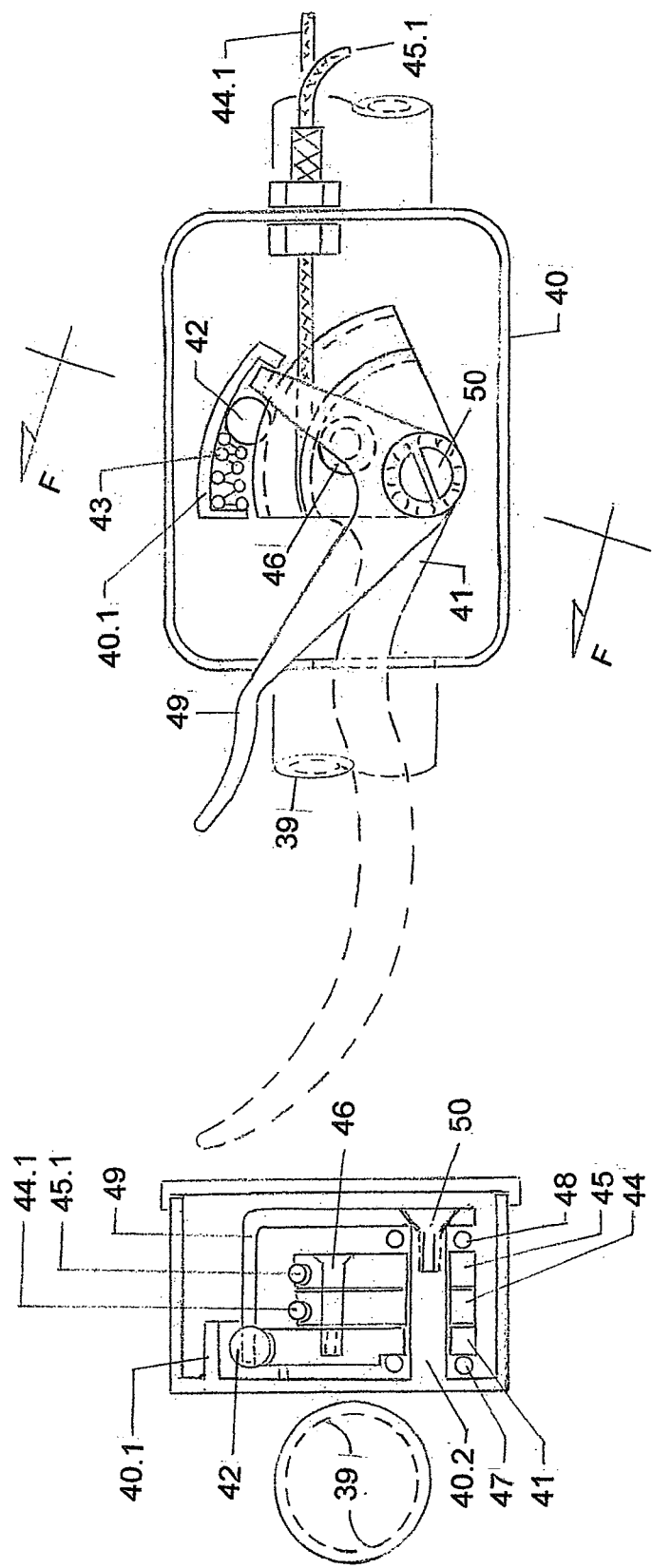
FIG. 7 is a sectional view of a portion of the braking mechanism associated with the present invention taken along Line E-E of FIG. 8.
FIG. 8 is a partial cutaway view of a portion of the braking mechanism associated with the present invention.

FIGS. 7 and 8 depict the vehicle brake mechanism showing the interaction of the vehicle brake to the hollow flywheel gyro 1 and vehicle wheel. The brake system components are normally mounted on the steering handles 39 of the pedaled vehicle. Brake housing assembly 40 is mounted to the steering handles 39 and includes an enclosure for release lever 40.1 that applies pressure on a grip ball 42 and spring 43. Brake handle 41 pivots about a threaded pivot stud 40.2 such that the distal end of the brake handle 41 contacts the grip ball 42 in channel 40.1. When brake handle 41 is engaged it causes grip ball 42 to compress the spring 43 for positive stopping. The braking action is tempered by the spring 43 maintaining the grip ball 42 in a desired displacement throughout the braking action.

The brake pulley 44, as shown in FIG. 7, has an associated channel for passage of an attached brake cord 44.1 that is attached to the brake calipers (not shown) on the drive wheel of the pedaled vehicle. When the brake handle 41 is rotated about the pivot stud 40.2 the brake cord 44.1 is contracted resulting in the engagement of the brake calipers stopping the pedaled vehicle. Concurrently, the transmission pulley 45, also pivoted around pivot stud 40.2, pulls on the transmission cord 45.1 disengaging the drive wheel from the pedals (and chain drive) allowing the pedals to drive only the hollow flywheel gyro 1 while the vehicle is stopped. The brake handle 41, brake pulley 44, and transmission pulley 45 are all connected through a threaded screw connector 46 to the pivot stud 40.2 (FIG. 7) to move in unison between around the pivot point. Bearing balls 47, 48 accommodate the rotation of the pulleys 44, 45 with an appropriate spacing.

The brake release lever 49 when pressed moves independently of pulleys 44, 45, to engage brake grip ball 42 by compressing spring 43. The entire assembly is secured by a threaded screw 50 threadedly engaged into pivot stud 40.2. When the brakes are applied, brake cord 44.1 is pulled activating the brakes to stop the pedaled vehicle. Simultaneously the transmission cord 45.1 is pulled that disengages the transmission disc 31 as described above.

In practice the pedal power drive is connected to both the wheel and the hollow flywheel gyro 1 such that the two move simultaneously and synchronously. When the brake is applied the mechanism in the hub or main axle 10 disengages the power drive from the wheel while allowing the hollow flywheel gyro 1 to remain powered. The rotational motion of the hollow flywheel gyro 1 not only functions to create gyroscopic stability about the drive wheel, but also creates a stability enhancing air envelope surrounding the wheel and hollow flywheel gyro 1 through the intake of adjacent air through the intake louvers 14.1 and the exhaust of that air volume from the hollow compartment within the hollow flywheel gyro 1 through the air exhaust louvers 14.2 and the air exhaust orifices 15.1 as the hollow flywheel gyro 1 rotates independently of the drive wheel of the vehicle. The air envelope exists in the immediate proximity to the sides of the hollow flywheel gyro 1 created by the rotation and air movement into and out of the various louvers and orifices 14.1, 14.2 and 15.1 arrayed along the side walls 14 and periphery 15 of the hollow flywheel gyro 1. The air envelope acts to enhance the gyroscopic effect of stabilization of the vehicle and preventing it from falling over as the hollow flywheel gyro 1 continues its rotational motion after the vehicle is stopped.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. An apparatus for stabilizing a vehicle by maintaining an upright position when approaching a stopped status and maintaining that stabilization when stopped comprising:

a hollow flywheel gyro mounted within the support spokes of the drive wheel of the vehicle onto a split hub of the main axle of the drive wheel of the vehicle being geared to permit greater independent rotation of the hollow flywheel gyro than the drive wheel of the vehicle, creating a higher torsional power than the drive wheel, and being free to continue rotational motion when decoupled from the vehicle drive wheel while maintaining driven rotational motion providing gyroscopic rotational stability to maintain the upright position of the vehicle when stopped; and, a plurality of predetermined shaped and sized apertures located in predetermined spaced apart positions in the sides of the hollow flywheel gyro for drawing air into the hollow interior space of the hollow flywheel gyro and then expelling that air to create a stabilizing air envelope to assist in maintaining the upright position of the vehicle when stopped, whereby the apparatus delivers the desired stabilization by not only functioning with gyroscopic stability but also creating an air envelope surrounding the hollow flywheel gyro to enhance the gyroscopic stability.

2. The apparatus for stabilizing a vehicle of claim 1, wherein said plurality of predetermined shaped and sized apertures include two groups, said first group of apertures being air intake apertures shaped as ovals extending outward along radial lines from the drive wheel hub at predetermined angular positions for approximately half the distance from the drive wheel hub to the outer perimeter rim of the hollow flywheel gyro, said second group of apertures being air expelling apertures shaped as ovals positioned outward from the first group of apertures and extending outward along the same radial lines from the drive wheel hub at the same predetermined angular positions, said first group of apertures consisting of larger ovals being positioned with each of their longer axes along the radial lines and said second group of apertures consisting of smaller ovals positioned with each of their longer axes perpendicular to and along the radial lines such that air drawn into the first group of larger oval apertures located closer to the hollow flywheel gyro center is pressurized within the hollow flywheel gyro due to the smaller size of the second group of oval apertures located closer to the perimeter rim of the hollow flywheel gyro such that the expelled pressurized air exits the hollow flywheel gyro through the air expelling apertures with a greater force assisting in maintaining an upright position for the vehicle when stopped.

3. The apparatus for stabilizing a vehicle of claim 1 further comprising a third group of complimentary air exhausting apertures consisting of arcuate openings located along the sides of the perimeter rim of the hollow flywheel gyro at positions outward of and along the same radial lines of the air intake and air expelling apertures for acting as additional air expelling apertures by directing the exhausted pressurized air in a direction to assist in the rotation of the hollow flywheel gyro in allowing the hollow flywheel gyro to attain higher speeds with lower input energy when stopped and in motion to further stabilize the vehicle.

4. The apparatus for stabilizing a vehicle of claim 1 further comprising air channel blades within the hollow center of the hollow flywheel gyro positioned at angular spacings creating substantially similar compartments within the hollow flywheel gyro separating the air intake and air expelling apertures along the same outwardly extending radial lines from each other and guiding the incoming airflow from the air intake apertures and moving the captured air by centrifugal force to the air expelling apertures closer to the outer perimeter of the hollow flywheel gyro.

5. The apparatus for stabilizing a vehicle of claim 1 further comprising a braking system having a binary function for operating the vehicle brakes and simultaneously operating a transmission for disconnecting the drive wheel from the vehicle pedals while maintaining connection of the hollow flywheel gyro to the vehicle pedals for continued driven rotational motion, such that as the brake handle is engaged applying the brake pads against the vehicle wheels to stop the vehicle the transmission connected to the drive wheel is placed into idle mode so that continuing rotational motion of the vehicle pedals is transferred entirely to the hollow flywheel gyro through the plurality of gears connecting the transmission to the hollow flywheel gyro.

\* \* \* \* \*